US010414361B2

(12) United States Patent
Pena Casimiro et al.

(10) Patent No.: US 10,414,361 B2
(45) Date of Patent: *Sep. 17, 2019

(54) HUMAN SCANNING FOR INTERIOR PREFERENCES SETUP (71) Applicant: Ford Global Technologies, LLC, Dearborn, MI (US)

(72) Inventors: Jesus Alejandro Pena Casimiro, Naucalpan (MX); Jorge Guillermo Barrios Albert, Azcapotzalco (MX)

(73) Assignee: Ford Global Technologies, LLC, Dearborn, MI (US)

( * ) Notice: Subject to any disclaimer, the term of this patent is extended or adjusted under 35 U.S.C. 154(b) by 107 days.

This patent is subject to a terminal disclaimer.

(21) Appl. No.: 15/651,989

(22) Filed: Jul. 17, 2017

(65) Prior Publication Data
US 2017/0313270 A1 Nov. 2, 2017

Related U.S. Application Data (63) Continuation of application No. 15/077,580, filed on Mar. 22, 2016, now Pat. No. 9,707,912.

(51) Int. Cl.
*B60R 16/037* (2006.01)
*G06F 16/2457* (2019.01)
(Continued)

(52) U.S. Cl.
CPC .......... *B60R 16/037* (2013.01); *B60Q 1/2665* (2013.01); *B62D 1/181* (2013.01); *G06F 16/24575* (2019.01); *G06K 9/00288* (2013.01); *G06K 9/00362* (2013.01); *B60N 2/0248* (2013.01); *B60N 2002/0268* (2013.01); *B60Q 2400/40* (2013.01); *B60Q 2400/50* (2013.01);
(Continued)

(58) Field of Classification Search
CPC .................. B60R 16/037; G06F 16/24575
See application file for complete search history.

(56) References Cited

U.S. PATENT DOCUMENTS 9,150,123 B2 10/2015 Jendritza et al.
2012/0020101 A1 1/2012 Pastrick et al.
(Continued)

FOREIGN PATENT DOCUMENTS

DE 102009040995 A2 4/2010
EP 2674914 A1 12/2013
JP 2009046026 A 3/2009

OTHER PUBLICATIONS

Search Report dated Sep. 11, 2017 for GB Patent Application No. GB 1704233.4 (3 pages).
(Continued)

*Primary Examiner* — Michael D Lang
(74) *Attorney, Agent, or Firm* — Frank Lollo; Neal, Gerber & Eisenberg LLP; James P. Muraff (57) ABSTRACT Systems and methods for human scanning for interior preference setup are disclosed. An example disclosed vehicle includes a target lamp on a side view mirror of the vehicle. The example vehicle also includes a scanning module. Additionally, the example vehicle includes an active scanning system configured to instruct the target lamp to project a position indicator a known distance from the vehicle, determine a joint structure based on an image of a person standing at the position indicator received from the scanning module, and adjust interior preference settings based on the detected joint structure.

20 Claims, 5 Drawing Sheets (51) Int. Cl.
*G06K 9/00* (2006.01)
*B62D 1/181* (2006.01)
*B60Q 1/26* (2006.01)
*B60N 2/02* (2006.01)
*B60R 25/25* (2013.01)
*B62D 1/10* (2006.01)

(52) U.S. Cl.
CPC ............... *B60R 25/25* (2013.01); *B62D 1/10* (2013.01); *G06K 9/00369* (2013.01); *G06K 9/00832* (2013.01)

(56) References Cited

U.S. PATENT DOCUMENTS

2013/0329960 A1 12/2013 Sandahl et al.
2014/0319895 A1 10/2014 Lange-Mao et al.
2015/0077327 A1 3/2015 Pisz et al.

OTHER PUBLICATIONS

Jamie Shotton et al., *Real-Time Human Pose Recognition in Parts From Single Depth Images*, Microsoft Research Cambridge & Xbox Incubation , (8 Pages).

HUMAN SCANNING FOR INTERIOR PREFERENCES SETUP

CROSS-REFERENCE TO RELATED APPLICATION

This application is a continuation application of U.S. application Ser. No. 15/077,580, filed on Mar. 22, 2016, which is incorporated herein by reference in its entirety. This application also relates to U.S. application Ser. No. 15/652,015 filed on Jul. 17, 2017, which is also incorporated herein by reference in its entirety.

TECHNICAL FIELD

The present disclosure generally relates to driver identification and, more specifically, human scanning for interior preferences setup.

BACKGROUND

Some vehicles, such as vehicles belonging to rental agencies or vehicles belonging company fleets, have a large number of different drivers such that keeping profiles of each driver is impractical. In cars with electronic seat control, the drivers still have to adjust the position and/or angle of the seat. Sometimes the driver can struggle to get the seat in a comfortable position.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Exemplary embodiments provide systems and methods for human scanning for interior preference setup. An example disclosed vehicle includes a target lamp on a side view mirror of the vehicle. The example vehicle also includes a scanning module. Additionally, the example vehicle includes an active scanning system configured to instruct the target lamp to project a position indicator a known distance from the vehicle, determine a joint structure based on an image of a person standing at the position indicator received from the scanning module, and adjust interior preference settings based on the detected joint structure.

An example disclosed vehicle includes a target lamp positioned on a side view mirror of the vehicle. The example vehicle also includes a processor and memory. Additionally, the example vehicle includes a program in memory configured to instruct a target lamp to project a position indicator a known distance from the vehicle, determine a joint structure based on an image of a person standing at the position indicator received from a scanning module, and adjust interior preference settings of the vehicle based on the detected joint structure.

An example disclosed computer readable medium comprises instructions that, when executed cause a vehicle to instruct a target lamp to project a position indicator a known distance from the vehicle. The target lamp is positioned on a side view mirror of the vehicle. The example instructions, when executed also cause the vehicle to determine a joint structure based on an image of a person standing at the position indicator received from a scanning module positioned on a center pillar of the vehicle. The example instructions, when executed also cause the vehicle to adjust interior preference settings of the vehicle based on the detected joint structure.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles (such as, cars, trucks, vans, sport utility vehicles, etc.) are being manufactured with systems to adjust interior preferences (such as seat position and/or angle, steering column position and/or angle, pedal position, etc.) of the vehicle. Vehicles can have different presets with the interior preferences for different drivers. In some instances, vehicles may have a large number of drivers. Additionally, drivers may find it difficult to manually adjust the interior preference settings (e.g., seat position, steering wheel position, etc.) to be comfortable. As disclosed below, the vehicle is equipped with an active scanning system that scans the driver and adjusts the interior preference settings to be positioned in accordance with a body profile developed by the scan. When the active scanning system is activated by the driver, the vehicle projects a position indicator on the ground at a known distance from the vehicle. The active scanning system scans the driver to build a profile of the driver by identifying on joint positions. Based on the profile, the active scanning system adjusts the interior preference settings of the vehicle.

Figure 1A:
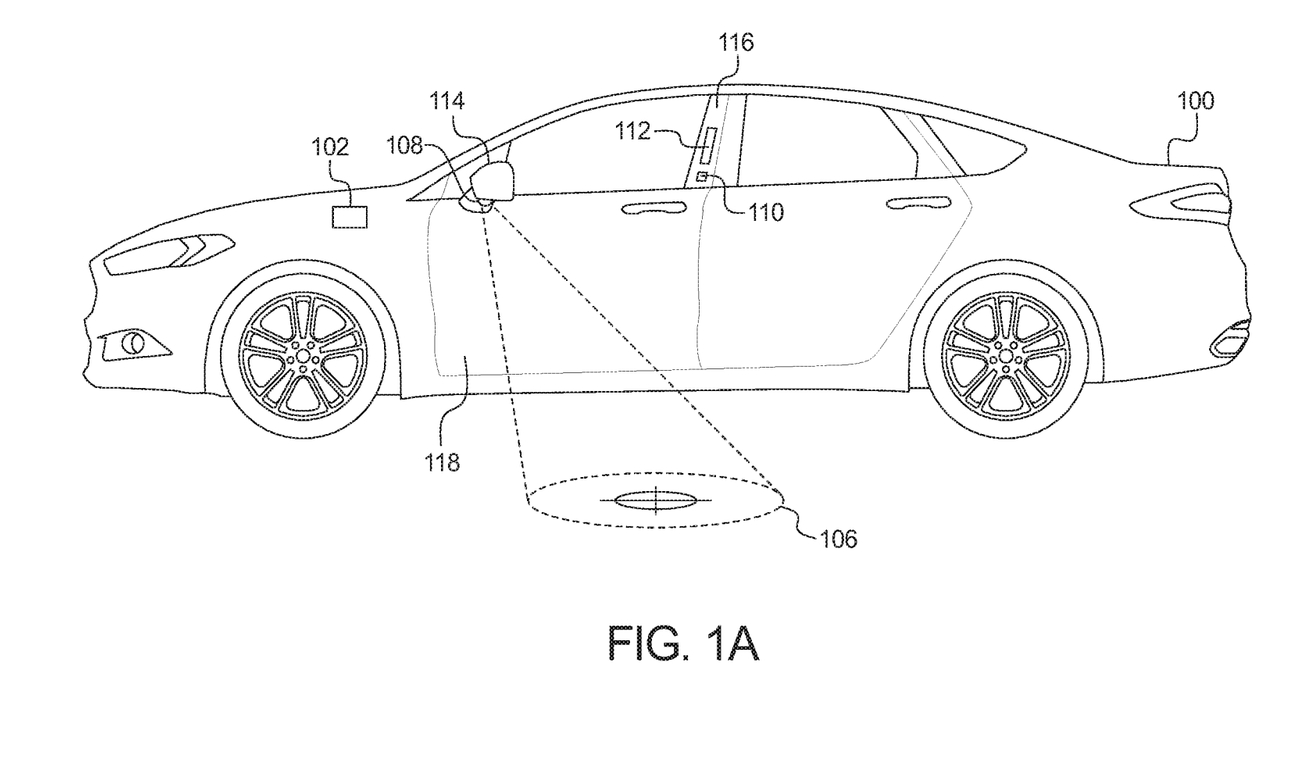
FIGS. 1A and 1B illustrate a vehicle with an active scanning system in accordance with the teachings of this disclosure.
Figure 1B:
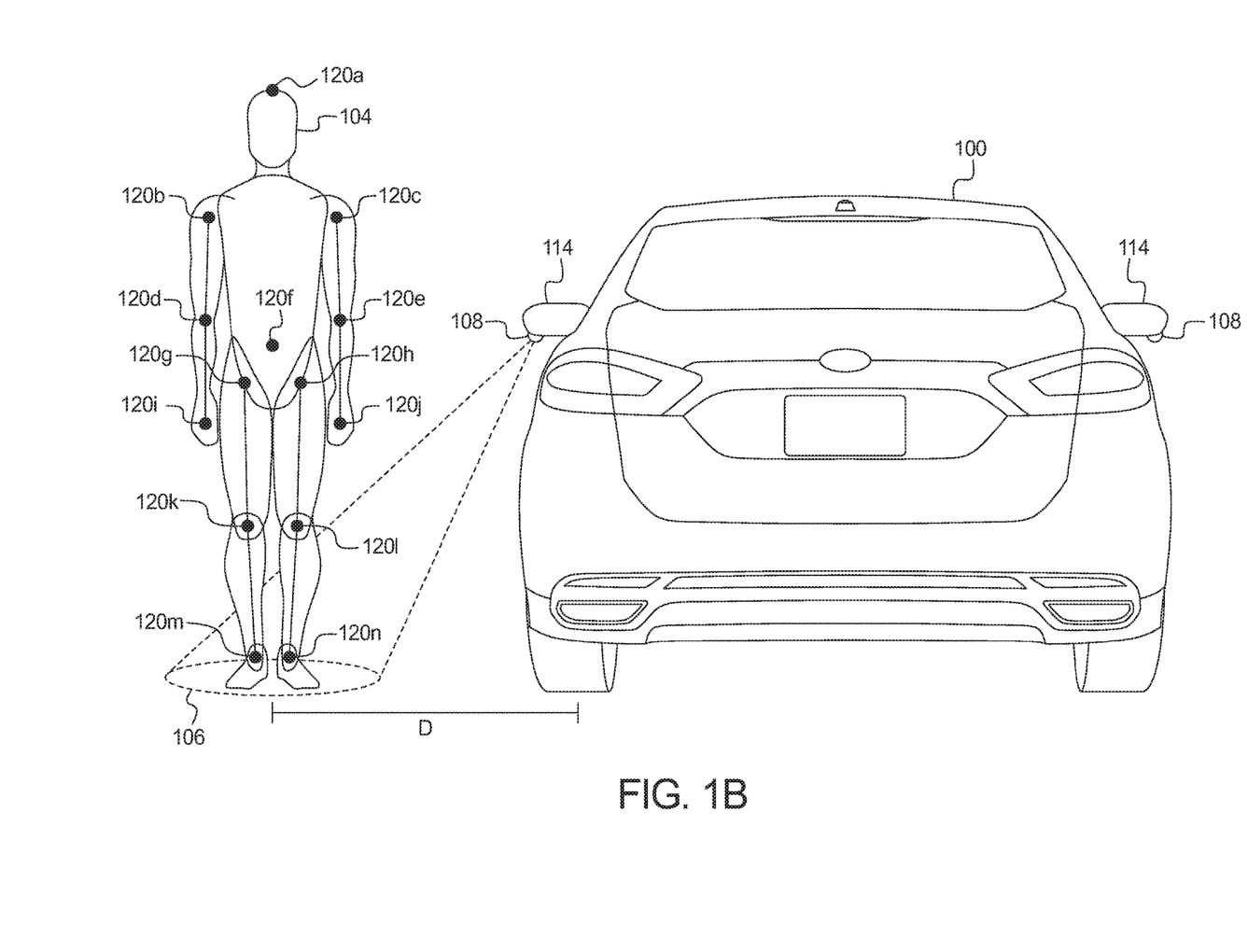

FIGS. 1A and 1B illustrate a vehicle 100 with an active scanning system 102 in accordance with the teachings of this disclosure. When the driver 104 activates the active scanning system 102, the vehicle 100 projects a position indicator 106 a known distance (D) from the vehicle 100. The vehicle 100 is any type of road vehicle (e.g., cars, trucks, vans, sport utility vehicles, etc.). The vehicle 100 may be a standard gasoline powered vehicle, a hybrid vehicle, an electric vehicle, a fuel cell vehicle, or any other type of suitable vehicle. The vehicle 100 includes a powertrain with an engine, a transmission, a suspension, and a driveshaft. The vehicle 100 also includes standard features (not shown) such as a dashboard, adjustable seats, one or more batteries, an HVAC system including a compressor and electronic expansion valve, a windshield, doors, windows, seatbelts, airbags, and tires.

The vehicle 100 includes a target lamp 108 (sometimes referred to as a turret light), a scanning module 110, and a keypad 112. The target lamp 108 projects the position indicator 106. In the illustrated example, the target lamp 108 is positioned on the bottom of a side view mirror 114. In other examples, the target lamp 108 may be installed in any suitable location (such as proximate a door handle, etc.) to project the position indicator 106 the known distance (D) from vehicle 100 so that the driver 104 may stand in the position indicator 106 before entering the vehicle 100. The target lamp 108 may include one or more incandescent lamps to project light through a light stencil to form the position indicator 106. Alternatively, in some examples, the target lamp 108 may include one or more light emitting diodes (LEDs) to project light through the light stencil to form the position indicator 106. The incandescent lamps and/or the LEDs may include different colors, such as red and green, to facilitate the active scanning system 102 signaling the driver 104. Additionally, in some examples, the target lamp 108 has different luminosity settings (e.g., higher lumen output for daytime, lower lumen output for nighttime, etc.).

The position indicator 106 is produced by shining the light though a light stencil in the target lamp 108. The position indicator 106 may be a symbol, such as a target symbol or a vehicle manufacturer logo, etc. Additionally, the position indicator 106 may be changeable to facilitate the target lamp 108 providing feedback to the driver 104.

In the illustrated example, the scanning module 110 is located on a center pillar 116 of a driver's side door 118 of the vehicle 100. The scanning module 110 includes an infrared light source (e.g., one or more infrared LEDs, etc.) and an infrared sensor chip. In some examples, the scanning module 110 also includes a camera to perform facial recognition on the driver. When the active scanning system 102 is activated, the infrared light source illuminates the subject. The infrared sensor chip measures reflected light to each pixel within the chip. The active scanning system 102 uses a depth map to perceive and identify joints 120a-120n of the driver 104 to construct a profile of the driver's joint structure based on the identified joints 120a-120n and the distances between the joints 120a-120n. Examples of using the infrared light source and the infrared sensor chip to perceive and the identify joints 120a-120n can be found in Shotton et al., "Real-Time Human Pose Recognition in Parts from Single Depth Images" (available at http://research.microsoft.com/pubs/145347/BodyPartRecognition.pdf), which is incorporated herein by reference in its entirety. As discussed in more detail below, based on the profile of the driver's joint structure, the active scanning system 102 adjusts the interior preference settings of the vehicle 100.

In some examples, the active scanning system 102 is activated by a button (e.g., a dedicated button, a door unlock button, etc.) on a key fob. Alternatively or additionally, in some examples, the active scanning system 102 is activated by the driver entering a code to unlock the door 118 into the keypad. In some examples, when active scanning system 102 is activated and the driver 104 is scanned, the vehicle 100 compares the identified joints 120a-120n and the distances between the joints 120a-120n to the driver profile(s). In some such examples, the vehicle 100 does not unlock the car unless the identified joints 120a-120n and the distances between the joints 120a-120n matches one of the known driver profiles. Additionally or alternatively, in some examples, the active scanning system 102 uses the camera to perform facial recognition on the driver. In such examples, the vehicle 100 does not unlock the car unless the vehicle recognizes the face of an authorized driver.

For example, when the vehicle 100 is purchased, the driver(s) 104 may be scanned by the active scanning system 102 to build the driver profile(s) that authorized to access the vehicle 100. In such an example, the driver 104 may prevent the vehicle 100 from being driven even if the potential driver has access to the key fob and/or the combination to the keypad 112. As another example, when the vehicle 100 is rented, the driver 104 may be scanned at the desk of the rental company to build the driver profile(s) for the authorized driver(s) 100. In such an example, the driver profile(s) may be managed (e.g., downloaded, erased, etc.) on the vehicle 100 via a wired or wireless (e.g., a wireless local area network, a cellular network, etc.).

Figure 2:
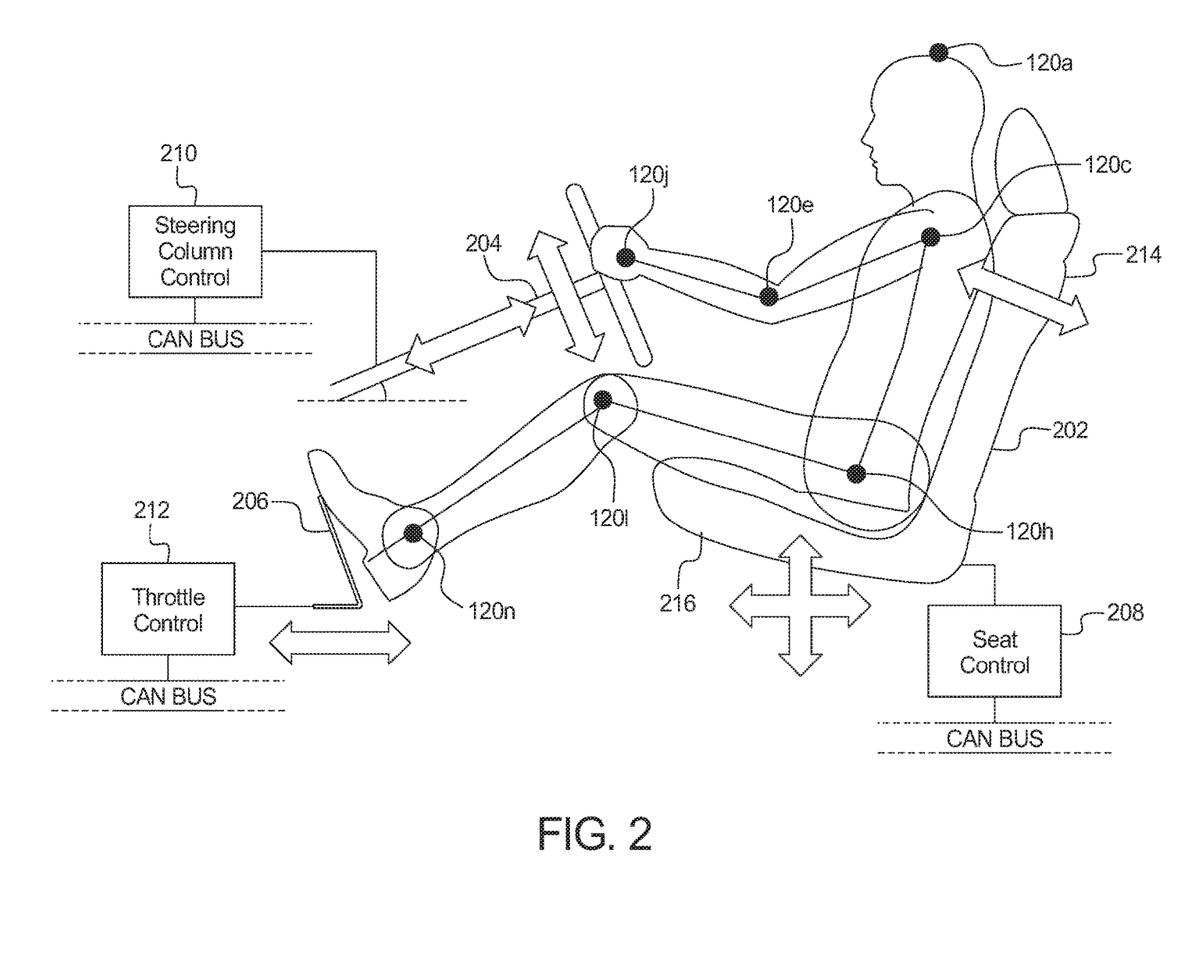
FIG. 2 illustrates an interior of the vehicle of FIGS. 1A and 1B.

FIG. 2 illustrates an interior 200 of the vehicle 100 of FIGS. 1A and 1B. In the illustrated example, the interior includes a seat 202, a steering column 204 and a set of pedals 206. The vehicle 100 also includes a seat control unit 208, a steering column unit 210, and a throttle control unit 212. The seat control unit 208, the steering column unit 210, and the throttle control unit 212 adjust the positions and/or angles of the seat 202, the steering column 204 and the set of pedals 206 based on the joint profile created by the active scanning system 102. The positions and/or angles of the seat 202, the steering column 204 and the set of pedals 206 are based on ergonomic presets that (i) promote comfort of the driver, and (ii) promote safe driving posture.

The example seat control unit 208 controls the position and/or angle of the seat 202. The seat 202 includes a back portion 214 and a bottom portion 216. The seat control unit 208 controls an angle of the back portion 214 at which it pivots in relation to the bottom portion 216. In some examples, the angle of the back portion 214 is based on (a) the distance between the waist joint 120f and the head joint 120a, and/or (b) the distances between the shoulder joints 120b and 120c, the elbow joints 120d and 120e, and the wrist joints 120i and 120j. The seat control unit 208 controls the height of the bottom portion 216 (and the back portion 214). In some examples, the height of the bottom portion 216 is based on the distance between the waist joint 120f and the head joint 120a. The seat control unit 208 also controls the longitudinal position (e.g., forward and back) of the bottom portion 216. In some examples, the he longitudinal position of the bottom portion 216 is based on (a) the distances between the hip joints 120g and 120h, the knee joints 120k and 120l, and the ankle joints 120m and 120n, and (b) the angle of the knee joints 120k and 120l in relation to the hip joints 120g and 120h and the ankle joints 120m and 120n.

The example steering column unit 210 controls the position and/or the angle of the steering column 204. The steering column unit 210 controls the angle at which the steering column pivots about its base. In some examples, the angle at which the steering column pivots is based on (a) the distance between the hip joints 120g and 120h and the knee joints 120k and 120l, and (b) the angle of the knee joints 120k and 120l in relation to the hip joints 120g and 120h and the ankle joints 120m and 120n. The steering column unit 210 also controls the length of the steering column 204. In some examples, the length of the steering column 204 is based on (a) the distance between the hip joints 120g and 120h and the knee joints 120k and 120l, and (b) the angle of the knee joints 120k and 120l in relation to the hip joints 120g and 120h and the ankle joints 120m and 120n.

The example throttle control unit 212 controls the longitudinal position of the pedals 206 (e.g., the brake pedal, the acceleration pedal, etc.). In some examples, the position of the pedals 206 is based on (a) the distances between the hip joints 120g and 120h, the knee joints 120k and 120l, and the ankle joints 120m and 120n, and (b) the angle of the knee joints 120k and 120l in relation to the hip joints 120g and 120h and the ankle joints 120m and 120n.

Figure 3:
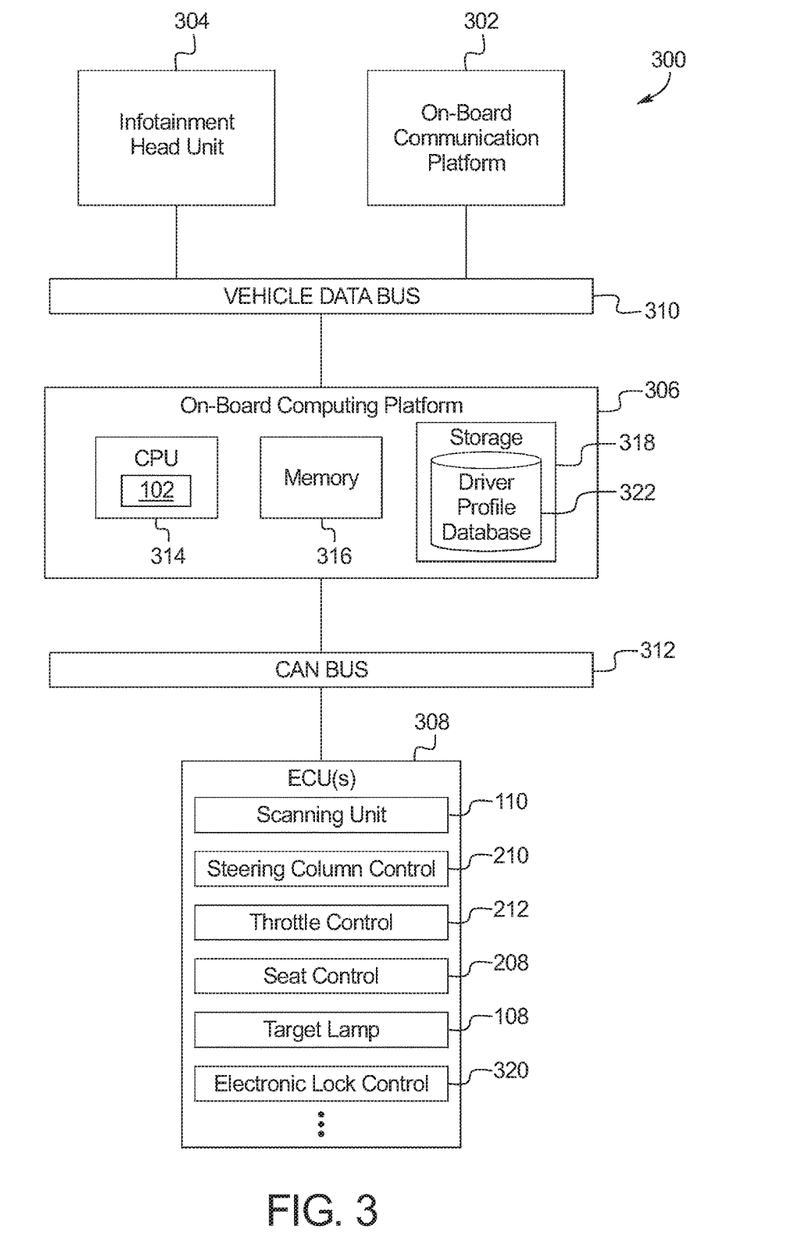
FIG. 3 illustrates electronic components of the vehicle of FIGS. 1A and 1B.

FIG. 3 illustrates electronic components 300 of the vehicle 100 of FIGS. 1A and 1B. The electronic components 300 include an example on-board communications platform 302, an example infotainment head unit 304, an on-board computing platform 306, example electronic control units (ECUs) 308, a vehicle data bus 310, and a controller area network (CAN) bus 312.

The on-board communications platform 302 includes wired or wireless network interfaces to enable communication with external networks. The on-board communications platform 302 also includes hardware (e.g., processors, memory, storage, antenna, etc.) and software to control the wired or wireless network interfaces. The on-board communications platform 302 includes controllers for Bluetooth® and/or other standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), and Wireless Gigabit (IEEE 802.11ad), etc.). The on-board communications platform 302 may also include a global positioning system (GPS) receiver. Further, the external network(s) may be a public network, such as the Internet; a private network, such as an intranet; or combinations thereof, and may utilize a variety of networking protocols now available or later developed including, but not limited to, TCP/IP-based networking protocols. The on-board communications platform 302 may also include a wired or wireless interface to enable direct communication with an electronic device (such as, a smart phone, a tablet computer, a laptop, etc.).

The infotainment head unit 304 provides an interface between the vehicle 100 and a user (e.g., a driver, a passenger, etc.). The infotainment head unit 304 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a dashboard panel, a heads-up display, a center console display (e.g., a liquid crystal display ("LCD"), an organic light emitting diode ("OLED") display, a flat panel display, a solid state display, or a heads-up display), and/or speakers.

The on-board computing platform 306 includes a processor or controller 314, memory 316, and storage 318. The on-board computing platform 306 is structured to include the active scanning system 102. The processor or controller 314 may be any suitable processing device or set of processing devices such as, but not limited to: a microprocessor, a microcontroller-based platform, a suitable integrated circuit, or one or more application-specific integrated circuits (ASICs). The memory 316 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), and read-only memory. In some examples, the memory 316 includes multiple kinds of memory, particularly volatile memory and non-volatile memory. The storage 318 may include any high-capacity storage device, such as a hard drive, and/or a solid state drive.

The memory 316 and the storage 318 are a computer readable medium on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 316, the computer readable medium, and/or within the processor 314 during execution of the instructions.

In the illustrated example, the storage 318 includes a driver profile database 322. The driver profile database 322 includes joint profiles and interior preference settings of the drivers of the vehicle 100. The joint profiles may be used to identify the driver 104. Additionally, the driver profile database 322 may include feature points for facial recognition. The interior preference settings include positions for the seat 202, the steering column 204, and the pedals 206. The interior preference settings may override the calculated settings of the active scanning system 102. The interior preference settings may also include other information, such as radio presets and HVAC settings. In some examples, the profiles in the driver profile database 322 are temporary. For example, the profiles may last for the duration that the car is rented and/or assigned to the driver.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The ECUs 308 monitor and control the systems of the vehicle 100. The ECUs 308 communicate and exchange information via the CAN bus 312. Additionally, the ECU(s) 308 may communicate properties (such as, status of the ECU 308, sensor readings, control state, error and diagnostic codes, etc.) to and/or receive commands from the on-board computing platform 306. Some vehicles 100 may have seventy or more ECUs 308 located in various locations around the vehicle 100 communicatively coupled by the CAN bus 312. The ECUs 308 (such as the scanning module 110, the seat control 208, etc.) are discrete sets of electronics that include their own circuit(s) (such as integrated circuits, microprocessors, memory, storage, etc.) and firmware, sensors, actuators, and/or mounting hardware. In the illustrated example, the ECUs 308 include the target lamp 108, the scanning module 110, the seat control unit 208, the steering column unit 210, the throttle control unit 212, and an electronic lock control 320. The electronic lock control 320 control locking and unlocking the vehicle 100 (e.g., in response to a key fob, etc.).

The vehicle data bus 310 communicatively couples the on-board communications platform 302, the infotainment head unit 304, and the on-board computing platform 306. The vehicle data bus 310 may be an Ethernet network or any other suitable network. The CAN bus 312 communicatively couples the ECUs 308, the on-board computing platform 306, and other devices connected to the CAN bus 312. The CAN bus protocol is defined by International Standards Organization (ISO) 11898-1. In some examples, the on-board computing platform 306 communicatively isolates the vehicle data bus 310 and the CAN bus 312 (e.g., via firewalls, message brokers, etc.). Alternatively, in some examples, the vehicle data bus 310 and the CAN bus 312 may be the same data bus.

Figure 4:
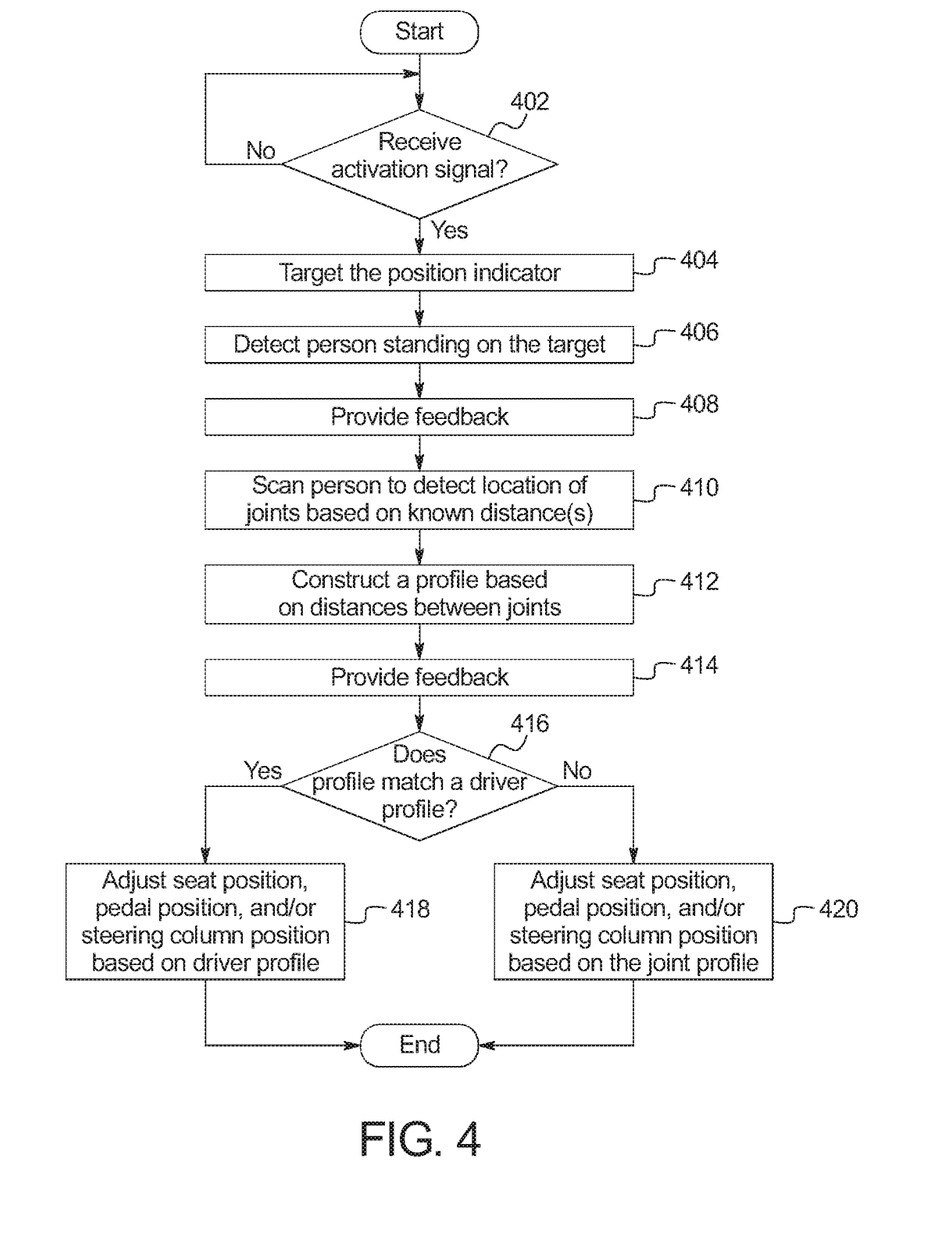
FIG. 4 is a flowchart of an example method to scan a driver that may be implemented by the electronic components of FIG. 3.

FIG. 4 is a flowchart of an example method to scan a driver 104 that may be implemented by the electronic components 300 of FIG. 3. Initially, the active scanning system 102 waits until the vehicle 100 receives a signal to activate the active scanning system 102 (block 402). In some examples, the active scanning system 102 may be activated by a button (such as a door unlock button, a dedicated activation button, etc.) on a key fob or activated in response to a code entered into the keypad 112. After being activated, the active scanning system 102 causes the target lamp 108 (e.g., by an instruction via the CAN bus 312) to project the position indicator 106 the known distance (D) proximate the driver's side door 118 (block 404). Because the target lamp 108 projects the position indicator 106 the known distance (D), the active scanning system 102 can calculate the height of the person based on the known distance (D). The height calculation is used to calculate the distance between the detected joints 120a-120n. The active scanning system 102 waits until it detects that a person is standing at the location of the position indicator 106 (block 406). In some examples, the active scanning system 102 causes the scanning module 110 to capture an image of the location of the position indicator 106 to determine whether the person is standing there. Alternatively or additionally, in some examples, the active scanning system 102 may use other sensors, such as ultrasonic sensors, to detect whether the person is standing at the location of the position indicator 106.

The active scanning system 102 provides feedback to indicate that the person has been detected (block 408). In some examples, the active scanning system 102 causes the target lamp 108 to change color (e.g., from red to yellow, etc.) and/or to blink. The active scanning system 102, via the scanning module 110, scans the person standing at the location of the position indicator 106 to detect the locations of the joints 120a-120n based on the known distance (D) (block 410). The active scanning system 102 constructs a joint profile based on the distances between the joints 120a-120n identified at block 410 (block 412). The active scanning system 102, via the target lamp 108, provides feedback to indicate that the joint profile has been constructed (block 414). In some examples, the active scanning system 102 causes the target lamp 108 to change color (e.g., from yellow to green, etc.) and/or to blink.

The active scanning system 102 determines whether the joint profile constructed at block 412 matches a driver profile stored in the driver profile database 322 (block 416). If the joint profile matches one of the driver profiles in the driver profile database 322, the active scanning system 102 adjusts the interior preference settings (e.g., the seat 202 position, the steering column 204 position, the pedal 206 position, etc.) in accordance with settings in matching driver profile via the respective ECUs 208, 210, and 212 (block 418). Otherwise, if the joint profile does not match one of the driver profiles in the driver profile database 322, the active scanning system 102 adjusts the interior preference settings (e.g., the seat 202 position, the steering column 204 position, the pedal 206 position, etc.) in accordance with joint profile via the respective ECUs 208, 210, and 212 (block 420).

The flowchart of FIG. 4 is representative of machine readable instructions that comprise one or more programs that, when executed by a processor (such as the processor 314 of FIG. 3), cause the vehicle 100 to implement the active scanning system 102 of FIG. 1. Further, although the example programs are described with reference to the flowchart illustrated in FIG. 4, many other methods of implementing the example active scanning system 102 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
    a target lamp coupled to the vehicle; and
    an active scanning control unit configured to, via a processor:
        instruct the target lamp to project a position indicator a known distance from the vehicle;
        determine a joint structure based on an image of a person at the position indicator; and
        adjust at least one of a seat position, a steering column position, and a pedal position based on the detected joint structure.

2. The vehicle of claim 1, wherein the active scanning control unit is configured to:
    detect, via a scanning module, the person standing a the position indicator; and
    in response to detecting the person, instructing the target lamp to provide feedback.

3. The vehicle of claim 2, wherein to provide feedback the target lamp changes a color of the position indicator.

4. The vehicle of claim 1, wherein the active scanning control unit is configured to instruct the target lamp to change a color of the position indicator in response to the active scanning control unit determining the joint structure.

5. The vehicle of claim 1, wherein the active scanning control unit is configured to compare the joint structure to profiles in a profile database.

6. The vehicle of claim 5, wherein the active scanning control unit is configured to adjust at least one of the seat position, the steering column position, and the pedal position based on one of the profiles in the profile database that matches the joint structure.

7. The vehicle of claim 5, wherein the active scanning control unit is configured to prevent the vehicle from unlocking when none of the profiles in the profile database match the joint structure.

8. A vehicle comprising:
a target lamp coupled to the vehicle;
a processor;
a program in memory configured to:
  instruct the target lamp to project a position indicator a known distance from the vehicle;
  determine a joint structure based on an image of a person standing at the position indicator received from a scanning module; and
  adjust at least one of a seat position, a steering column position, and a pedal position of the vehicle based on the detected joint structure.

9. The vehicle of claim 8, wherein the program in the memory is configured to:
detect, via the scanning module, the person standing at the position indicator; and
in response to detecting the person, instructing the lamp to provide feedback.

10. The vehicle of claim 9, wherein to provide feedback the target lamp changes a color of the position indicator.

11. The vehicle of claim 8, wherein the program in the memory is configured to instruct the target lamp to change a color of the position indicator in response to the active scanning system determining the joint structure.

12. The vehicle of claim 8, wherein the program in the memory is configured to compare the joint structure to profiles in a profile database.

13. The vehicle of claim 12, wherein the program in the memory is configured to adjust at least one of the seat position, the steering column position, and the pedal position based on one of the profiles in the profile database that matches the joint structure.

14. The vehicle of claim 12, wherein the program in the memory is configured to prevent the vehicle from unlocking when none of the profiles in the profile database that match the joint structure.

15. A computer readable medium comprising instructions that, when executed cause a vehicle to:
instruct a target lamp coupled to the vehicle to project a position indicator a known distance from the vehicle;
determine a joint structure based on an image of a person standing at the position indicator; and
adjust interior preference settings of the vehicle based on the detected joint structure, the interior preferences include at least one of a seat position, a steering column position, and a pedal position.

16. The computer readable medium of claim 15 comprising instructions that, when executed cause the vehicle to:
detect, via a scanning module, the person standing at the position indicator; and
in response to detecting the person, instructing the lamp to provide feedback.

17. The computer readable medium of claim 15 comprising instructions that, when executed cause the vehicle to instruct the target lamp to change a color of the position indicator in response to the active scanning system determining the joint structure.

18. A computer readable medium of claim 15 comprising instructions that, when executed cause the vehicle to adjust at least one of the seat position, the steering column position, and the pedal position based on one of the profiles in the profile database that matches the joint structure.

19. The computer readable medium of claim 15 comprising instructions that, when executed cause the vehicle to prevent the vehicle from unlocking when none of the profiles in the profile database that match the joint structure.

20. The computer readable medium of claim 15 wherein the image of the person standing at the position indicator is received from a scanning module positioned on a center pillar of the vehicle.

* * * * *